United States Patent [19]

Lal

[11] 4,020,250

[45] Apr. 26, 1977

[54] PREPARATION OF HALOGENATED POLYMERS

[75] Inventor: Joginder Lal, Akron, Ohio

[73] Assignee: The Goodyear Tire & Rubber Company, Akron, Ohio

[22] Filed: Aug. 2, 1976

[21] Appl. No.: 710,500

Related U.S. Application Data

[63] Continuation of Ser. No. 484,736, July 1, 1974, abandoned.

[52] U.S. Cl. .................................. 526/13; 526/20; 526/42; 526/43; 526/46; 526/52
[51] Int. Cl.$^2$ .............. C08F 210/00; C08F 212/00
[58] Field of Search .................... 526/13, 20, 43, 46

[56] References Cited

UNITED STATES PATENTS

| | | | |
|---|---|---|---|
| 2,944,578 | 7/1966 | Baldwin et al. .................... | 152/330 |
| 3,859,263 | 1/1975 | O'Connor et al. .................... | 526/75 |

FOREIGN PATENTS OR APPLICATIONS

| | | |
|---|---|---|
| 2,262,723 | 6/1973 | Germany |
| 1,023,407 | 3/1966 | United Kingdom |
| 989,491 | 4/1965 | United Kingdom |

OTHER PUBLICATIONS

H. S. Makowski in "Polymer Chemistry of Synthetic Elastomer" Part II (Interscience, New York, 1969) pp. 905–937.

*Primary Examiner*—Joseph L. Schofer
*Assistant Examiner*—A. L. Clingman
*Attorney, Agent, or Firm*—F. W. Brunner; J. Y. Clowney

[57] ABSTRACT

A method of preparing halogenated interpolymers wherein α-olefins are polymerized with nonconjugated polyolefins in the presence of coordination catalysts to prepare interpolymers which are subsequently reacted with suitable halogenating compounds to form new compositions of matter.

9 Claims, No Drawings

PREPARATION OF HALOGENATED POLYMERS

This is a continuation, of application Ser. No. 484,736 filed July 7, 1974, now abandoned.

This invention is directed to a method of preparing halogenated polymers of α-olefins and to the polymers produced thereby.

More particularly, this invention is directed to a method of preparing interpolymers of α-olefins with nonconjugated polyolefins, where polyolefin means having more than one double bond, and then reacting said interpolymers with suitable halogenating compounds to form new compositions of matter.

Thus, according to the invention, halogenated polymers of higher α-olefins are prepared by reacting higher α-olefins with nonconjugated polyolefins in the presence of coordination catalysts and subsequently contactng said interpolymers with halogenating compounds to form said halogenated polymers.

The thrust of the invention is not directed to the catalyst system of the polymerization process for it is well known in the prior art. The thrust of the invention lies in new compositions of materials and to the fact that a new process has been devised for incorporating halogens into pendant groups of a polymer chain. The halogenated polymers of this invention may be liquid, rubbery, leathery or resinous. The usefulness of halogenated polymers of higher α-olefins would lie in improved solvent-resistant characteristics and/or excellent resistance to ozone attack. The halogenated polymers are also interest as fire retardant materials and for improvement in adhesion to other elastomers and metals.

The α-olefins used in preparing interpolymers may contain from 4 to 20 carbon atoms. Representative of the types of α-olefins which can be utilized in the practice of this invention to prepare the interpolymers which are subsequently halogenated are 1-butene, 1-pentene, 1-hexene, 1-heptene, 1-octene, 1-nonene, 1-decene, 1-dodecene, 1-octadecene and other low molecular weight α-olefins. The α-olefin does not necessarily have to be linear in nature. Some examples of branched α-olefins are 3-methyl-1-butene, 4-methyl-1-pentene, 4-ethyl-1-hexene and the like.

Representative of nonconjugated polyolefins which can be utilized in the practice of this invention are ing application Ser. No. 383,213. In the co-pending application Ser. No. 383,213, it was shown that on metathesis a reaction mixture of cyclooctene and 1-hexene gives a mixture of polyolefins wherein the highest molecular weight polyolefin identified was $C_{34}H_{60}$. The major component was $C_{14}H_{26}$, i.e. 1,9-tetradecadiene. When such a mixture is interpolymerized with at least one α-olefin, the resulting polymer contains both internal and terminal bonds in the pendant groups. A cycloolefin or nonconjugated cyclopolyolefin such as 1,5,9-cyclododecatriene may be employed in the above metathesis reaction in place of cyclooctene. Likewise, a higher α-olefin such as 1-dodecene may be employed in place of 1-hexene. Thus, the polyolefins obtained from the metathesis reaction can contain components having as high as 50 carbon atoms. For most practical purposes, it is preferred to select the reacting components so that the component with the highest number of carbon atoms does not exceed 40 carbon atoms.

Copolymers or interpolymers which can be utilized in this invention are exemplified below. In FIG. 1, it is shown that 1-hexene can be copolymerized with 1,7-octadiene to yield an unsaturated copolymer having pendant groups with terminal double bonds. In FIG. 2, it is seen that a mixture of 1-hexene, 1-butene and trans-1,4-hexadiene can be polymerized to produce a terpolymer having pendant groups with internal double bonds. It should be understood that one skilled in the art could alter the molar ratios of and the types of monomers to produce a host of copolymers and interpolymers:

FIG. 1

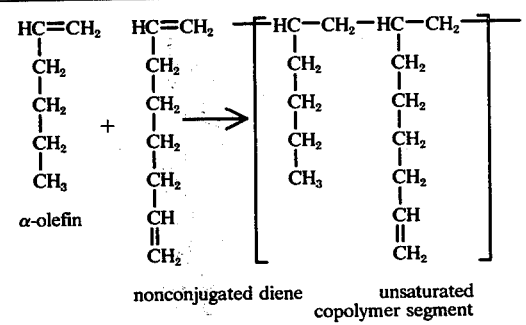

nonconjugated diene    unsaturated copolymer segment

FIG. 2

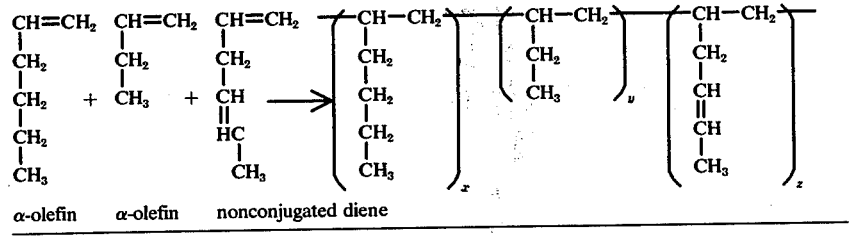

α-olefin    α-olefin    nonconjugated diene 1,5-hexadiene, 1,6-heptadiene, 1,6-octadiene, 1,7-octadiene, 1,9-decadiene, trans-1,4-hexadiene, cis-1,4-hexadiene, 2-methyl-1,5-hexadiene, 3-methyl-1,5-hexadiene, 4-methyl-1,4-hexadiene, 5-methyl-1,4hexadiene, 5-methyl-1,5-heptadiene, 6-methyl-1,5-heptadiene, 1,9-tetradecadiene, 1,5,9-tetradecatriene, 1,5,9,13,17-nonadecapentaene, and other nonconjugated di- or polyolefins prepared according to co-pending wherein x, y and z are integers.

Likewise, it is possible to use more than one polyene in synthesizing an interpolymer. For instance, a mixture of 1-butene and 1-hexene may be polymerized with a mixture of 1,7-octadiene and trans-1,4-hexadiene.

The polymerization reactions of the present invention may be accomplished by the use of catalysts generally known as coordination catalysts. Representative of such catalyst systems is a mixture of an organometallic reducing agent with a transition metal salt, or mixtures thereof. Compounds of the transition heavy metals are those derived from metals of the B sub-groups of IV to VII or Group VIII of the Periodic Table. The organometallic reducing agents are selected from organometallic compounds, hydrides and free metals of Groups I to IV of the Periodic Table. The compounds of the transition metals are preferably halides, oxyhalides, and alcoholates, the preferred metals being titanium and vanadium. The metals of the organometallic reducing agents are preferably lithium, magnesium, aluminum and tin and the organic portions are preferably hydrocarbon radicals, containing 1–10 carbon atoms or aryl groups such as phenyl, tolyl or naphthyl. Preferably the organometallic compound is an aluminum compound, more preferably an alkyl aluminum halide. In these organometallic compounds, the valences of the metal may be partially satisfied by halogen or alkoxy, provided, of course, that at least one bond connects the metal with an organic radical. Mixtures of two or more compounds of the type described above may often be used to advantage. These catalysts are not the subject of the present application. Coordination catalysts have been reviewed in "Stereochemistry of Macromolecules", edited by A. D. Ketley and published by Marcel Dekker, Inc., New York (1967). The addition of a third component, consisting of an electron donor molecule, may be employed to the benefit of the above coordination catalysts. Examples of donor molecules include various amines, phosphines, ethers, sulfides, pyridines, and related compounds classified as electron donor molecules. Ordinarily, the transition metal salt is employed in an amount such as to provide about 0.0002 to 0.001, preferably about 0.0003 to 0.0004 mole of transition metal compound per mole of monomers being polymerized.

The organometallic compound is usually employed in an amount so as to provide an organometallic compound/transition metal compound molar ratio of about 0.5 to 15, preferably about 0.75 to 5, most preferably about two.

The amount of catalyst by weight is from about 0.1 to about 10 phm (parts per hundred parts of monomer), the preferred range being about 0.5 to 5 phm.

The polymerizations should be conducted in an inert solvent. By "inert solvent" is meant one that will not adversely affect the reaction rate or reaction product. Convenient solvents are aliphatic, aromatic or cycloaliphatic hydrocarbons. Representatives of such solvents are heptane, hexane, benzene, toluene, cyclopentane, cyclohexane and the like. Chlorinated hydrocarbons such as trichloroethylene, tetrachloroethylene, chlorobenzene may be used.

The polymerization reactions involved in this invention can be carried out over a wide range of temperatures. It is convenient to carry out the process at temperatures of −20° C. to 100° C., preferably 0° C. to 50° C. The reactions may be carried out at atmospheric pressure or subatmospheric pressure or superatmospheric pressure.

The unsaturated polymers prepared as described above in this specification are not the thrust of the invention. The halogen containing polymers resulting from the reaction of halogenating agents or compounds with the unsaturated polymers described above are the subject of this invention. The interpolymers are prepared such that there are double bonds in the pendant groups capable of reacting with halogenating compounds to form the new materials.

The halogenating compounds useful in the practice of this invention may be divided into two classes. Class A halogenating agents or compounds consist of polyhalocyclopentadienes and related compounds which react with the double bond by Diels-Alder reaction. Some representative examples are hexachlorocyclopentadiene, hexabromocyclopentadiene, tetrachlorodifluorocyclopentadiene, 5-allyl-(1,2,3,4-tetrachloro) cyclopentadiene, 5-ethyl-(1,2,3,4,5-pentachloro) cyclopentadiene and the like.

Class B halogenating compounds consists of halogenating halogenating agents or compounds which react with the double bond by addition or substitution-type mechanism. Some representative examples are: chlorine, bromine, iodine, iodine chloride, cyanogen chloride, cyanogen bromide, iodine bromide and sulfuryl chloride. Where the reactions are likely to be violent, for instance, with fluorine, it is preferable to use indirect means for carrying out halogenation. For example, fluorine derivatives may be prepared by the reaction of chlorine, bromine, or iodine derivatives of unsaturated polymers with antimony trifluoride. Antimony pentachloride may be used as a catalyst in this reaction. Another method is to react unsaturated polymers with lead tetrafluoride, thereby adding a molecule of fluorine across the double bond.

In preparing the halogen-containing derivatives of this invention, there may be used other halogenating agents which liberate or become sources of halogens. For instance, for preparing bromine-containing derivatives, sodium hypobromite, magnesium bromide hexahydrate, N-bromosuccinimide, N-bromoacetamide, tribromophenol bromide, beta-bromoethyl phthalimide, pyridinium bromide perbromide, dibromodimethyl hydantoin, etc. may be employed. Similarly, for preparing chlorine-containing derivatives, sodium hypochlorite, sulfuryl chloride, N-chlorosuccinimide, dichlorodimethyl hydantoin, etc. may be used. For practical and economic considerations, chlorine and bromine are preferred halogenating agents belonging to the Class B.

Chlorination may be carried out in the presence of UV light. The rate of reaction of iodine with double bonds may be increased by employing catalysts known in the art. For convenience, the halogenating compound may be dissolved in an inert solvent prior to reaction with the unsaturated polymer solution. Some aspects of halogenating alkenes have been reviewed in "Organic Chemistry", H. Gilman, Editor-in-Chief, John Wiley and Sons, Inc., New York, 1947.

In FIGS. 3 and 4 are shown some examples of the halogenation of unsaturated polymers (wherein x and y are integers) containing double bonds in the pendant groups with some of the above halogenating agents. FIG. 3 depicts the Diels-Alder reaction of a copolymer of 1-hexene and 1,7-octadiene with hexachlorocyclopentadiene:

FIG. 3

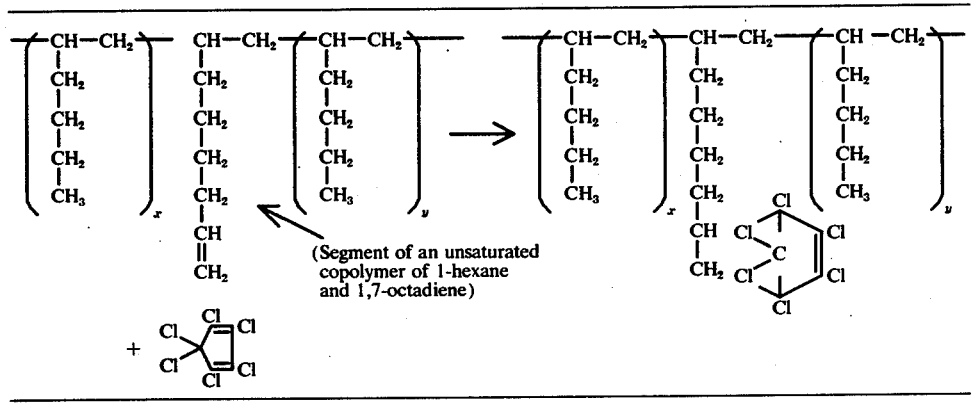

FIG. 4 shows the reactions of bromine and chlorine separately with a copolymer of 1-hexene and 1,5-heptadiene:

FIG. 4

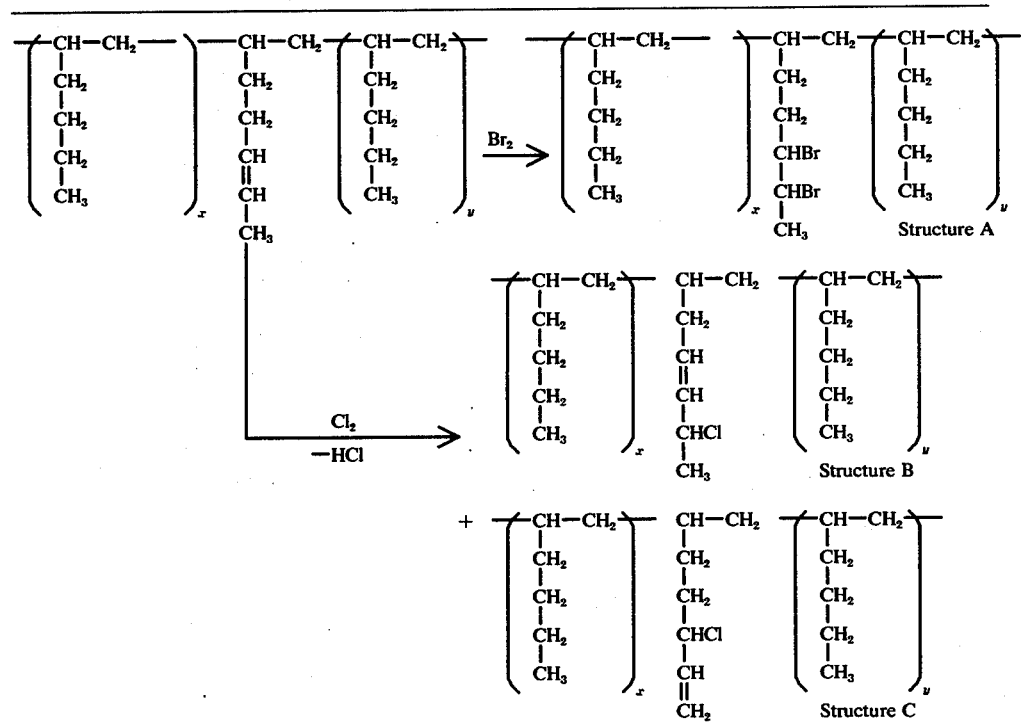

The product shown on bromination is an addition product, although some substitution product is probably formed as well. This latter reaction is exemplified with chlorination wherein both structures A and B are shown. On chlorination, substitution is the dominant reaction, although some addition product is probably formed also. The substitution products result from the addition of Cl$^+$ on across the double bond, followed by loss of a proton. Most of the unsaturation originally present is thus retained in the chlorinated product. The attached chloro group serves to enhance the reactivity of the double bond and also provides additional functionality for subsequent vulcanization.

The reactions of the unsaturated polymers of this invention with halogenating agents may be carried out in suitable inert solvents. Examples of such solvents are pentane, hexane, heptane, benzene, toluene, cyclopentane, cyclohexane, decalin, carbon tetrachloride, dchloroethane, and other suitable inert solvents. For instance, bromination of an unsaturated copolymer may be preformed by reacting the copolymer with bromine in the presence of methyl chloride or ethyl chloride. The Diels-Alder reaction can conveniently be carried out at temperatures from about 25° C. to about 150° C. In general, higher temperatures are required when the double bonds are internal, preferably using tin-based stabilizers.

The amount of halogen incorporated into the unsaturated copolymer depends on the nature of the halogenating agent and reaction conditions. For example, with hexachlorocyclopentadiene or hexabromocyclopentadiene, 6 halogen atoms may be incorporated per olefin double bond in the unsaturated copolymer. With bromine, more than two bromine atoms may be introduced per olefin double bond present in the unsaturated copolymer.

The amount of halogenating compound to be reacted with the polymer cannot be specifically set down. It will depend on the degree of unsaturation in the unsaturated polymer and the extent of halogenation desired. What can be said is that a sufficient amount is needed to impart the desired physical and chemical characteristics into the polymer.

The molar ratio of α-olefin to nonconjugated polyolefin in the unsaturated copolymer may vary from 99:1 to 1:99, preferably from 97:3 to 3:97.

The molar ratios of the monomers used in preparing the unsaturated interpolymers may vary over a wide range. The molar ratio of the monomers will determine the amount of unsaturation that will be built into the copolymer or interpolymer during the initial polymerization step. The molar ratio of structural units derived from α-olefins to the structural units derived from nonconjugated polyolefins in the unsaturated copolymer may vary from 99:1 to 1:99, preferably from 97:3 to 3:97, and more preferably from 96:4 to 50:50.

When a monomer is polymerized, the resulting structure is called its structural unit. For instance, when 1-hexene is polymerized the structural unit derived from it is

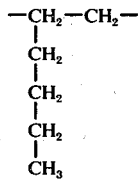

For instance, if the molar charge ratio of 1-hexene to 1,7-octadiene is relatively low, then a relatively large amount of the diene will undergo copolymerization, the result being a large amount of available unsaturation per kilogram of the copolymer for the subsequent Diels-Alder reaction with the halogenating compounds of Class A and/or reaction with halogenating Compounds of Class B. Also, the type of halogen compound one wants to react with the double bonds in the copolymer or interpolymers may depend on the type of polyolefin material used as a monomer. For instance, if one is going to use hexachlorocyclopentadiene as the halogen-containing material, then the polyolefin should be chosen so that the unsaturation is preferably available at the terminal carbons. A monomer such as cis- or trans-1,4-hexadiene would give the internal unsaturation in the copolymer and a polyolefin such as 1,7-octadiene would give a terminally unsaturated side chain. Mixtures of halogenating agents selected from both Class A and B may be used for halogenating an unsaturated polymer simultaneously or in a step-wise fashion.

The halogenated polymers of this invention may be liquid, rubbery, leathery or resinous. Their physical appearance is governed by a number of factors including molecular weight, composition of copolymers or interpolymers, degree of halogenation and the type of halogenating agent. For obtaining liquid halogenated products it is desirable that the copolymers of interpolymers to be halogenated be liquid also. Such liquid polymers may be prepared by methods well-known in the art. For instance, copolymerization or interpolymerization may be carried out with coordination catalysts in the presence of hydrogen, the hydrogen pressure and polymerization temperature being important factors in controlling the molecular weight.

EXPERIMENTAL

Unless otherwise specified, the following solutions and suspensions were used for carrying out the polymerization reaction.

Triethylaluminum-titanium tetrachloride-vanadium tetrachloride ($Et_3Al$-$TiCl_4$-$VCl_4$) three-component catalyst was preformed at about 90° C. according to the general procedure of British Pat. No. 886,371 and the resulting suspension used as a polymerization catalyst in heptane. The titanium and vanadium halides together constituted 0.4 molarity with the atomic ratio of titanium/vanadium (Ti/V) being one and the atomic ratio of aluminum/(titanium + vanadium) [Al/(Ti+V)] being 0.4. For polymerization purposes, the preformed catalyst was modified with additional triethylaluminum (TEAL) so that the final ratio of Al/Ti was 2.5. Triethylaluminumtitanium tetrachloride catalyst was also preformed and used for polymerization according to the general procedure for the three-component catalyst.

Another type of catalyst system used for synthesizing unsaturated copolymers consisted of α-titanium trichloridetriethylaluminum (α-$TiCl_3$ - $Et_3Al$) or α-titanium trichloridediethylaluminum chloride (α-$TiCl_3$ -$Et_2AlCl$). The α-$TiCl_3$ used contained 0.33 moles of aluminum trichloride per mole of α-$TiCl_3$.

Unless stated otherwise, all polymerization reactions were conducted in a nitrogen atmosphere. The polymerization mixture was precipitated in excess methanol containing 0.2 percent N,N-diaryl-p-phenylenediamine stabilizer, followed by drying under reduced pressure.

As employed in this specification, inherent viscosity is defined as the natural logarithm of the relative viscosity at 30° C. divided by the polymer concentration for a 0.05 to 0.10 percent (w./v.) solution in toluene containing 0.1 percent N,N-diaryl-p-phenylenediamine stabilizer and expressed in units of deciliters per gram (dl./g.).

The practice of this invention is illustrated by reference to the following examples which are intended to be representative rather than restrictive of its scope.

EXAMPLE I

A copolymer of 1-hexene and 1,7-octadiene was synthesized according to the following procedure. A solution of 677 grams 1-hexene, 99 grams 1,7-octadiene and 1-liter n-pentane was dried by passing through a silica gel column and transferred to a 1-gallon reactor fitted with a serum cap. The molar ratio of 1-hexene to 1,7-octadiene was 90:10. The solution was purged free of oxygen by sparging with nitrogen. A 2.0 ml. suspension of an $Et_3Al$-$TiCl_4$-$VCl_4$ preformed catalyst was injected through the serum cap, followed by 1.23 ml. solution of $Et_3Al$ (1.56 molar in n-heptane). The atomic ratio of Al/(Ti+V) in the final catalyst was 2.50. The preformed catalyst was prepared at about 95° C. in n-heptane according to the literature procedure (British Pat. No. 886,371). The molar concentration of titanium plus vanadium halides in the preformed catalyst was 0.37, Ti/V atomic ratio was 1.0 and Al/(Ti+V) atomic ratio was 0.40. Polymerization was allowed to continue at 25° C. for 72 hours. The polymerization mixture was agitated on a shaker throughout the reaction period. After precipitation in excess methanol, the copolymer was dried under vacuum to give 535 grams of a rubbery material (69 percent conversion). It had an inherent viscosity of 2.9 dl./g. and 17 percent gel in toluene solvent.

A 100 gram (gm.) portion of this copolymer was dissolved in 1500 milliliters (ml.) toluene at 110° C. in a 3-liter resin-kettle fitted with a condenser, mechanical stirrer, nitrogen inlet and dropping funnel. A polymer solution containing finely dispersed gel was obtained. Hexachlorocyclopentadiene (218 grams, 0.8 mole) was added slowly from the dropping funnel to the copolymer solution maintained at 105° C. The reaction was allowed to continue for 24 hours at 105° C. After cooling, the reaction mixture was precipitated in excess methanol. The precipitated rubber was dried in a vacuum oven at 40° C. The rubbery adduct had an inherent viscosity of 2.5 dl./g. and 28 percent gel. A portion of the adduct was extracted with acetone in a Soxhlet apparatus to remove residual hexachlorocyclopentadiene and dried under vacuum. The adduct contained 3.0 percent chlorine. It's unsaturation, as determined by iodine monochloride method, was 0.84 moles/kg. The unsaturation of the original copolymer was 1.08 moles/kg. These data demonstrate that about 15 to 20 percent of the double bonds in the original copolymer had reacted with hexachlorocyclopentadiene.

The adduct was compounded in a Brabender with the following ingredients which are expressed as weight parts per 100 parts of the adduct:

| | |
|---|---|
| ISAF black | 50.0 |
| Zinc oxide | 5.0 |
| Stearic acid | 1.0 |
| Mercaptobenzothiazole | 0.5 |
| Tetramethylthiuram disulfide | 1.0 |
| Sulfur | 2.0 |

Curing at 300° F. in a Monsanto Rheometer gave maximum torque of 54 inch-pounds, minimum torque of 7 inch-pounds and the time for 90 percent of maximum cure was 40 minutes. Identical Rheometer data were obtained for a similarly compounded stock prepared from the original copolymer. Thus, there was no decrease in the curing rate of the adduct even though it had 15 to 20 percent lower unsaturation than its precursor copolymer.

EXAMPLE II

A copolymer of 1-hexene and 1,7-octadiene (molar charge ratio 90:10) was synthesized according to the general procedure in Example I. It has an inherent viscosity of 3.5 dl./g. and 25 percent gel. A solution of 43.3 grams of this copolymer and 95 grams of hexachlorocyclopentadiene in 750 ml. toluene containing finely dispered gel was heated at 110° C. for 24 hours. After cooling, the reaction mixture was precipitated in excess methanol. The yield of the product was 51.5 grams, inherent viscosity 1.5 dl./g., gel 16 percent. An acetone-extracted sample contained 14.1 percent chlorine, indicating that about 70 percent of the double bonds in the original copolymer had reacted with hexachlorocyclopentadiene.

EXAMPLE III

A compolymer of 1-hexene and trans-1,4-hexadiene (molar charge ratio 93.75:6.25) was synthesized according to the following procedure:

A solution of 842 grams 1-hexene, 55 grams trans-1,4-hexadiene in 1250 ml. pentane was polymerized according to the general procedure in Example I except that the preformed catalyst was prepared from $Et_3Al$ and $TiCl_4$. A 40 ml. portion of this preformed catalyst suspension (0.48 molar titanium chloride; Al/Ti atomic ratio = 0.40) and 26 ml. $Et_3Al$ solution (1.5 molar in n-heptane) were used for carrying out the polymerization. The ratio of Al/Ti in the final catalyst was 2.50. After 72 hours, the copolymer was isolated as in Example I. The copolymer conversion was 58 percent. It had an inherent viscosity of 2.6 dl./g. and contained no gel.

A 50 gram portion of the copolymer was dissolved in 2 liters of carbon tetrachloride in a one-gallon reactor and was subsequently sparged with nitrogen. The reaction mixture was stirred with a magnetic stirrer. The reactor was fitted with a serum cap and 4.0 grams of bromine was injected into the reactor with a hypodermic syringe. The reaction was allowed to continue for 24 hours. The reaction product was precipitated in excess methanol. The precipitated rubber was redissolved in toluene, followed by precipitation in excess methanol. The brominated rubber had 6.85 percent bromine, an inherent viscosity of 1.5 dl./g. and 26 percent gel. Its unsaturation was 0.24 mole/kg. The unsaturation of the original copolymer was 0.71 mole/kg.

The above reaction of the copolymer and bromine was repeated except that 2.0 grams of bromine were used for bromination. The brominated rubber had an inherent viscosity of 2.0 dl./g., 18 percent gel and 3.5 percent bromine. Its unsaturation was 0.44 mole/kg.

EXAMPLE IV

In interpolymer was synthesized under nitrogen from 28 grams 1-butene, 31.2 grams 1-hexene and 7.95 grams methyl hexadiene in 300 ml. n-heptane. The methyl hexadiene used was a 60:40 mixture of 4-methyl-1,4-hexadiene and 5-methyl-1,4-hexadiene. The molar charge ratio of 1-butene:1-hexene: methyl hexadiene was 60:30:10. Polymerization was carried out using a catalyst of 2.0 ml. suspension of $\alpha$-$TiCl_3$ (1.16 molar in heptane) and 2.40 ml. $Et_2AlCl$ solution (1.5 molar in heptane). The $\alpha$-$TiCl_3$ used contained 0.33 mole of $AlCl_3$ for each mole of $\alpha$-$TiCl_3$. After polymerization for 72 hours at room temperature (25° C.), the conversion to the interpolymer was 64 percent. It had an inherent viscosity of 3.9 dl./g. in toluene and no gel.

A 9.0 gram portion of the interpolymer was dissolved in two liters of carbon tetrachloride and reacted with 0.48 gram bromine according to the procedure in Example III. The resulting brominated adduct had 5.2 percent bromine. Its unsaturation was 0.05 mole/kg. whereas the unsaturation of the precursor was 0.49 mole/kg.

EXAMPLE V

A copolymer was prepared from a mixture of 40 mole percent 1-hexene and 60 mole percent trans-1,4-hexadiene using the $\alpha$-$TiCl_3$/$Et_3Al$ catalyst system described in Example IV. A solution of 84.5 grams 1-hexene and 123 grams trans-hexadiene in 300 ml. heptane was polymerized under nitrogen with a catalyst of 8 ml. suspension of $\alpha$-$TiCl_3$ (1.25 molar in heptane) and 20 ml. Et$_3$Al solution (1.5 molar in heptane). After polymerization for 120 hours at 25° C., the conversion to the copolymer was 23 percent. The copolymer had unsaturation of 5.7 moles/kg. and a glass transition temperature of −41° C. by differential thermal analysis.

A 25 gram portion of the above copolymer was dissolved in 1500 ml. carbon tetrachloride in a resin-kettle fitted with a stirrer, condenser and dropping funnel. A viscous cement was obtained. A solution of 5.8 grams of bromine in 50 ml. carbon tetrachloride was added dropwise to the stirred cement over a period of 30 minutes. The reaction temperature was maintained at 26° C. during this period. After 24 hours, a small amount of 1-hexene was added to the reaction mixture to react with any residual bromine. This was followed by coagulation of the entire mixture in excess acetone-methanol (1:1 by volume). The precipitated polymer was washed twice with acetone and then dried under vacuum. A leathery material, 29 grams, was obtained. It contained 19.8 percent bromine and had unsaturation of 3.8 moles per kilogram.

The halogenated polymers of this invention may be stabilized with suitable stabilizers known in the art. They may be compounded and vulcanized according to the curing systems known in the art.

This invention thus consists of a method of preparing halogenated interpolymers by contacting at least one higher α-olefins containing 4 to 20 carbon atoms with at least one nonconjugated polyolefins containing 5 to 40 carbon atoms in the presence of coordination catalysts to form interpolymers containing unsaturation and subsequently reacting said interpolymers with halogenating compounds.

For instance, halogenated interpolymers may be obtained wherein the halogenated structural units

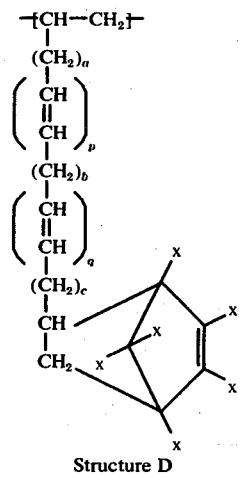

Structure D are interdispersed with structural units derived from at least one α-olefin selected from the group of α-olefins containing from 4 to 20 carbon atoms and at least one nonconjugated polyolefins having from 5 to 40 carbon atoms and wherein $a$, $b$, and $c$ are integers, $p = 0$ or 1, $q = 0$ or 1, and $a+b+c+2(p+q) \leq 36$ and $x$ is selected from the group consisting of chlorine and bromine.

Also of interest are halogenated interpolymers wherein the halogenated structural units

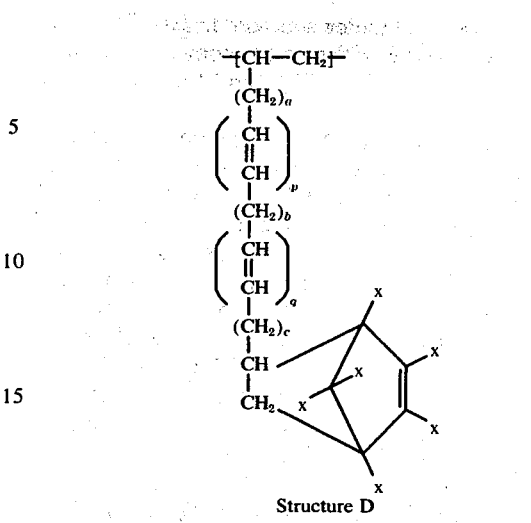

Structure D are interdispersed with structural units derived from at least one α-olefin selected from the group of α-olefins containing from 4 to 20 carbon atoms and wherein $a$, $b$, and $c$ are integers, $p = 0$ or 1, $q = 0$ or 1, and $a+b+c+2(p+q) \leq 36$, and $x$ is selected from the group consisting of chlorine and bromine.

It should be understood that the halogenated interpolymers having Structure D type units can be further reacted with halogenating compounds from the Class B type compounds to halogenate completely or partially the remaining double bonds.

Still other halogenated interpolymer compostions are made by the process of reacting at least one α-olefin having from 4 to 20 carbon atoms with at least one nonconjugated polyolefin having from 5 to 40 carbon atoms in the presence of coordination catalysts to form interpolymers wherein sad nonconjugated polyolefin is prepared by the metathesis reaction of an α-olefin with a cycloolefin and/or a nonconjugated cyclopolyolefin to form unsaturated interpolymers and subsequently reacting with halogenating compounds.

For instance, interpolymer compositions wherein the following Structural units E and/or F

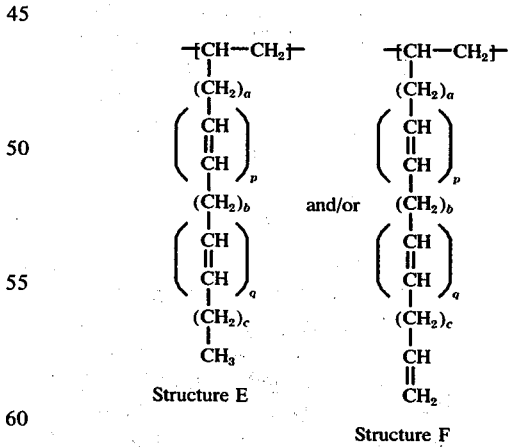

Structure E  Structure F are halogenated by Class B type compounds and are interdispersed with structural units derived from at least one α-olefin selected from the group of α-olefins containing from 4 to 20 carbon atoms and wherein for Structure E, $a$, $b$, and $c$ are integers, $p = 0$ or 1, $q = 0$ or 1 and $a+b+c+2(p+q) \leq 37$ and wherein for Structure F, $a$, $b$, and $c$ are integers, $p = 0$ or $1$, $q = 0$ or $1$ and $a+b+c+2(p+q) \leq 36$.

It should be understood that the halogenated interpolymers having structural units E and/or F can be further reacted with halogenating compounds from the Class A type compounds to halogenate completely or partially the remaining double bonds.

While certain representative embodiments and details having been shown for the purpose of illustrating the invention, it will be apparent to those skilled in this art that various changes and modifications may be made therein without departing from the spirit or scope of the invention.

What is claimed is:

1. Halogenated interpolymer compositions consisting of the reaction product of one or more α-olefins having 4 to 20 carbon atoms with one or more nonconjugated polyolefins having from 5 to 40 carbon atoms, said α-olefins and non-conjugated polyolefins having been polymerized in the presence of coordination catalysts to form unsaturated interpolymers, said unsaturated interpolymers being characterized by having pendant groups containing double bonds, and subsequently reacting said unsaturated interpolymers with halogenating compounds.

2. Halogenated interpolymer compositions consisting of the reaction product of one or more α-olefins having from 4 to 20 carbon atoms with one or more nonconjugated polyolefins having from 5 to 40 carbon atoms, said α-olefins and non-conjugated polyolefins having been polymerized in the presence of coordination catalysts to form unsaturated interpolymers wherein said nonconjugated polyolefin is prepared by the metathesis reaction of an α-olefin with a cycloolefin or a nonconjugated cyclopolyolefin, said unsaturated interpolymers being characterized by having pendant groups containing double bonds, and subsequently reacting said unsaturated interpolymers with halogenating compounds.

3. Halogenated interpolymer compositions consisting of the reaction product of one or more α-olefins having from 4 to 20 carbon atoms with one or more nonconjugated polyolefins having from 5 to 40 carbon atoms, said α-olefins and nonconjugated polyolefins having been polymerized in the presence of coordination catalysts to form unsaturated interpolymers, said unsaturated interpolymers being characterized by having pendant groups containing double bonds, and subsequently reacting said unsaturated interpolymers with halogenating compounds selected from the group consisting of chlorine, bromine, iodine chlorine, iodine, cyanogen chloride, cyanogen bromide, iodine bromide and sulfuryl chloride.

4. Halogenating interpolymer compositions consisting of the reaction product of one or more α-olefins having from 4 to 20 carbon atoms with one or more nonconjugated polyolefins having from 5 to 40 carbon atoms, said α-olefins and non-conjugated polyolefins having been polymerized in the presence of coordination catalysts to form unsaturated interpolymers, said unsaturated interpolymers being characterized by having pendant groups containing double bonds, and subsequently reacting said unsaturated interpolymers with halogenating compounds selected from the group consisting of hexachlorocyclopentadiene, hexabromocyclopentadiene, 5-allyl-(1,2,3,4-tetrachloro) cyclopentadiene, tetrachlorodifluorocyclopentadiene and 5-ethyl-(1,2,3,4,5-pentachloro) cyclopentadiene.

5. The halogenated interpolymers according to claim 1 wherein at least one α-olefin containing from 4 to 10 carbon atoms is polymerized with the metathesis reaction product derived from an α-olefin containing from 2 through 8 carbon atoms with cyclopentene or cyclooctene in the presence of a coordination catalyst to form unsaturated interpolymers, said unsaturated interpolymers being characterized by having pendant groups containing double bonds and subsequently reacting said unsaturated interpolymers with chlorine or bromine.

6. The halogenated interpolymers according to claim 1 wherein at least one α-olefin containing from 4 through 10 carbon atoms is polymerized with the metathesis reaction product derived from an α-olefin containing from 2 through 8 carbon atoms with cyclopentene or cyclooctene in the presence of a coordination catalyst to form saturated interpolymers, said saturated interpolymers characterized by having pendant groups containing double bonds and subsequently reacting said unsaturated interpolymers with hexachlorocyclopentadiene.

7. The halogenated interpolymers according to claim 1 wherein at least one α-olefin containing from 4 through 10 carbon atoms is polymerized with at least one nonconjugated polyolefin selected from the group consisting of 1,4-hexadiene, 4-metyl-1,4-hexadiene and 5-methyl-1,4-hexadiene, in the presence of coordination catalyst to form unsaturated interpolymers, said unsaturated interpolymers being characterized by having pendant groups containing double bonds and subsequently reacting said unsaturated interpolymers with chlorine or bromine.

8. Halogenated interpolymer compositions wherein the following structural units E or F

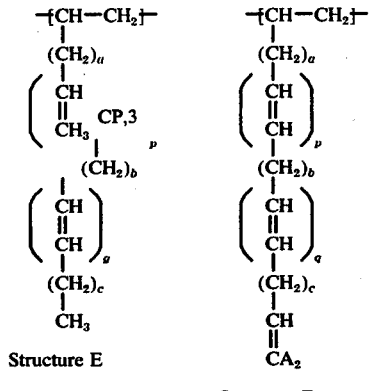

Structure E    Structure F are halogenated by at least one compound selected from the group consisting of chlorine, bromine, iodine chloride, iodine, cyanogen chloride, cyanogen bromide, iodine bromide and sulfuryl chloride and are interdispersed with structural units derived from one or more α-olefins having from 4 to 20 carbon atoms, and one or more nonconjugated polyolefins having from 5 to 40 carbon atoms, and wherein for Structure E, $a$, $b$ and $c$ are integers, $p = 0$ or $1$, $q = 0$ or $1$ and $a+b+c+2(p+q) \leq 37$ and wherein for Structure F, $a$, $b$ and $c$ are integers, $p = 0$ or $1$, $q = 0$ or $1$ and $a+b+c+2(p+q) \leq 36$.

9. Halogenated interpolymer compositions wherein the following structural units E or F

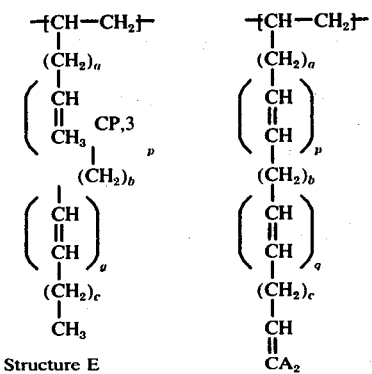

Structure E

Structure F are halogenated by at least one compound selected from the group consisting of chlorine, bromine, iodine chloride, iodine, cyanogen chloride, cyanogen bromide, iodine bromide, and sulfuryl chloride and are interdispersed with structural units derived from one or more α-olefins having from 4 to 20 carbon atoms and wherein for Structure E, A, $b$ and $c$ are integers, $p = 0$ or 1, $q = 0$ or 1 and $a+b+c+2(p+q) \leq 37$ and wherein for Structure F, $a$, $b$ and $c$ are integers, $p = 0$ or 1, $q = 0$ or 1, and $a+b+c+2(p+q) \leq 36$.

* * * * *

UNITED STATES PATENT OFFICE
CERTIFICATE OF CORRECTION

PATENT NO. : 4,020,250

DATED : April 26, 1977

INVENTOR(S) : Joginder Lal

It is certified that error appears in the above-identified patent and that said Letters Patent are hereby corrected as shown below:

Col. 1, Line 65, "5-methyl 1,5-heptadiene" should be --5-methyl 1,4-heptadiene--.

Col. 3, Line 38, "0.001" should be --0.01--.

Col. 6, Line 20, "dchloroethane" should be --dichloroethane--.

Col. 7, Line 63, "of" should be --or--.

Col. 10, Example IV, Line 39, "In" should be --An--.

Claims 8 and 9, structures E and F, should appear as per attached page.

Signed and Sealed this

Twenty-third Day of August 1983

[SEAL]

Attest:

GERALD J. MOSSINGHOFF

Attesting Officer

Commissioner of Patents and Trademarks

Claim 8,
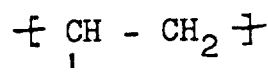
(CH₂)ₐ
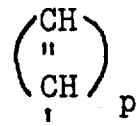
(CH₂)_b
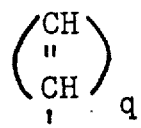
(CH₂)_c
CH₃
Structure E
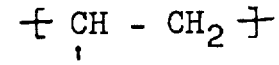
(CH₂)ₐ
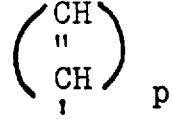
(CH₂)_b
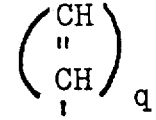
(CH₂)_c
CH
‖
CH₂
Structure F
Claim 9,
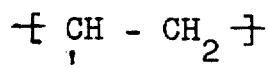
(CH₂)ₐ
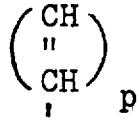
(CH₂)_b
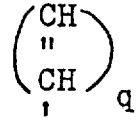
(CH₂)_c
CH₃
Structure E
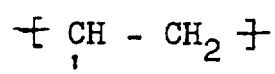
(CH₂)ₐ
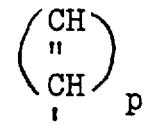
(CH₂)_b
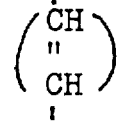
(CH₂)_c
CH
‖
CH₂
Structure F